United States Patent [19]

Locatelli et al.

[11] Patent Number: 5,689,068
[45] Date of Patent: Nov. 18, 1997

[54] DETERMINATION OF THE POROSITY AND PERMEABILITY OF A GEOLOGICAL FORMATION FROM AN ELECTROFILTERING PHENOMENON

[75] Inventors: Marcel Locatelli, Montbonnot; Jean Berthier, Meylan; Henri Glenat, Corenc, all of France

[73] Assignee: Commissariat a l'Energie Atomique, Paris, France

[21] Appl. No.: 586,458

[22] Filed: Jan. 11, 1996

[30] Foreign Application Priority Data

Jan. 10, 1995 [FR] France ................... 95 00202

[51] Int. Cl.⁶ .................. F21B 49/00; G01V 03/26; G01V 11/00
[52] U.S. Cl. .................. 73/152.02; 73/152.18; 73/152.32; 73/152.24; 73/38; 324/338; 324/353; 324/351
[58] Field of Search ........... 73/152.02, 152.05, 73/152.18, 152.19, 152.22, 152.32, 152.24, 152.25, 38; 324/338, 348, 353, 351

[56] References Cited

U.S. PATENT DOCUMENTS

| | | | |
|---|---|---|---|
| 2,179,593 | 11/1939 | Jakosky | 175/182 |
| 2,212,274 | 8/1940 | Martienssen | 175/182 |
| 2,554,174 | 5/1951 | Doll | 175/182 |
| 2,814,017 | 11/1957 | Doll | 324/1 |
| 2,974,273 | 3/1961 | Vogel et al. | 324/1 |
| 3,559,085 | 1/1971 | Semmelink | 324/1 |
| 3,691,456 | 9/1972 | Warren | 324/10 |
| 3,839,914 | 10/1974 | Modisette et al. | 73/438 |
| 4,427,944 | 1/1984 | Chandler | 324/353 |
| 4,904,942 | 2/1990 | Thompson | 324/323 |
| 5,031,467 | 7/1991 | Rambow | 73/861.25 |
| 5,214,384 | 5/1993 | Sprunt et al. | 324/351 |
| 5,417,104 | 5/1995 | Wong | 73/38 |
| 5,503,001 | 4/1996 | Wong | 73/38 |

FOREIGN PATENT DOCUMENTS

WO 94/28441   12/1994   WIPO .

OTHER PUBLICATIONS

Pride, et al., "Electrokinetic Dissipation Induced by Seismic Waves," *Geophysics*–vol. 6(7), pp. 914–925 (1991).

Primary Examiner—Hezron E. Williams
Assistant Examiner—J. David Wiggins
Attorney, Agent, or Firm—Burns, Doane, Swecker & Mathis LLP

[57] ABSTRACT

The porosity and permeability of a geological formation (2) are determined on the basis of an electrofiltering phenomenon by exploiting the existence of non-linear electrofiltering phenomena. One or two pressure generators (11) are used to propagate a pressure wave in the formation. Electrodes (14, 15) applied against the wall of the formation pick up the electric response of the formation. The detection of a resonance frequency or a phase shift corresponding to an extremum of the electric response of the formation makes it possible to calculate the porosity or permeability of the formation or find their values from charts.

16 Claims, 4 Drawing Sheets

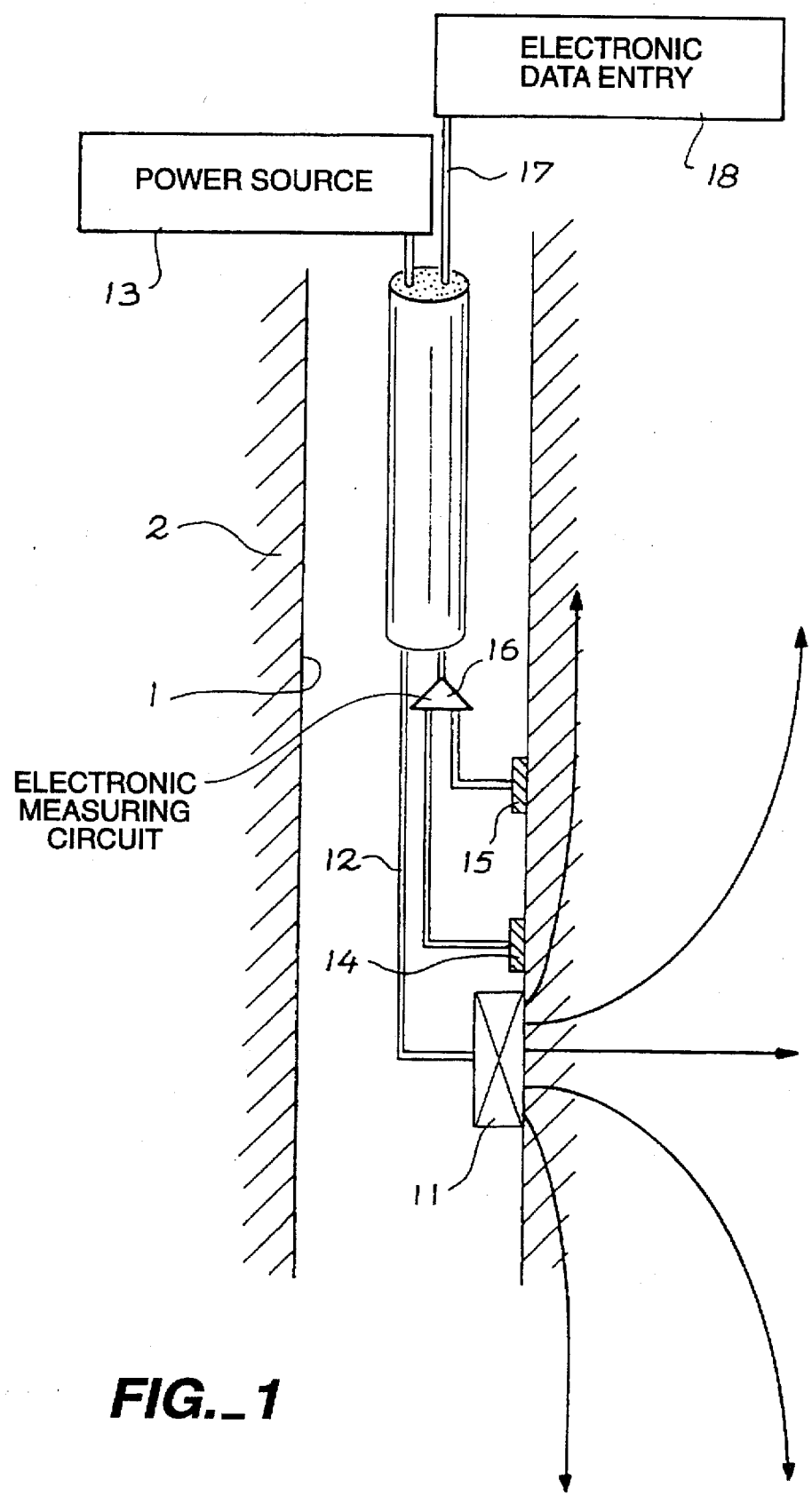
FIG._1

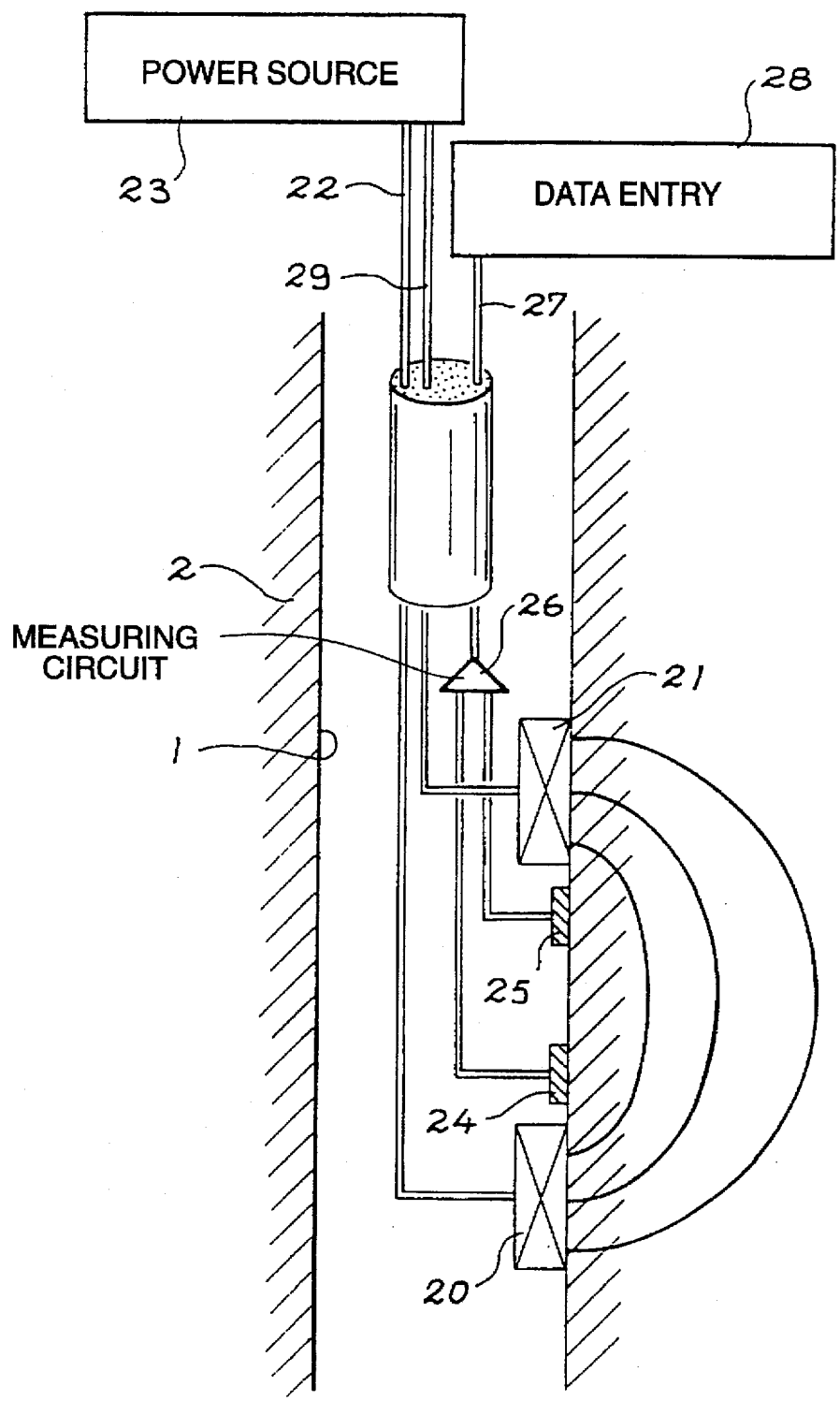
FIG._2

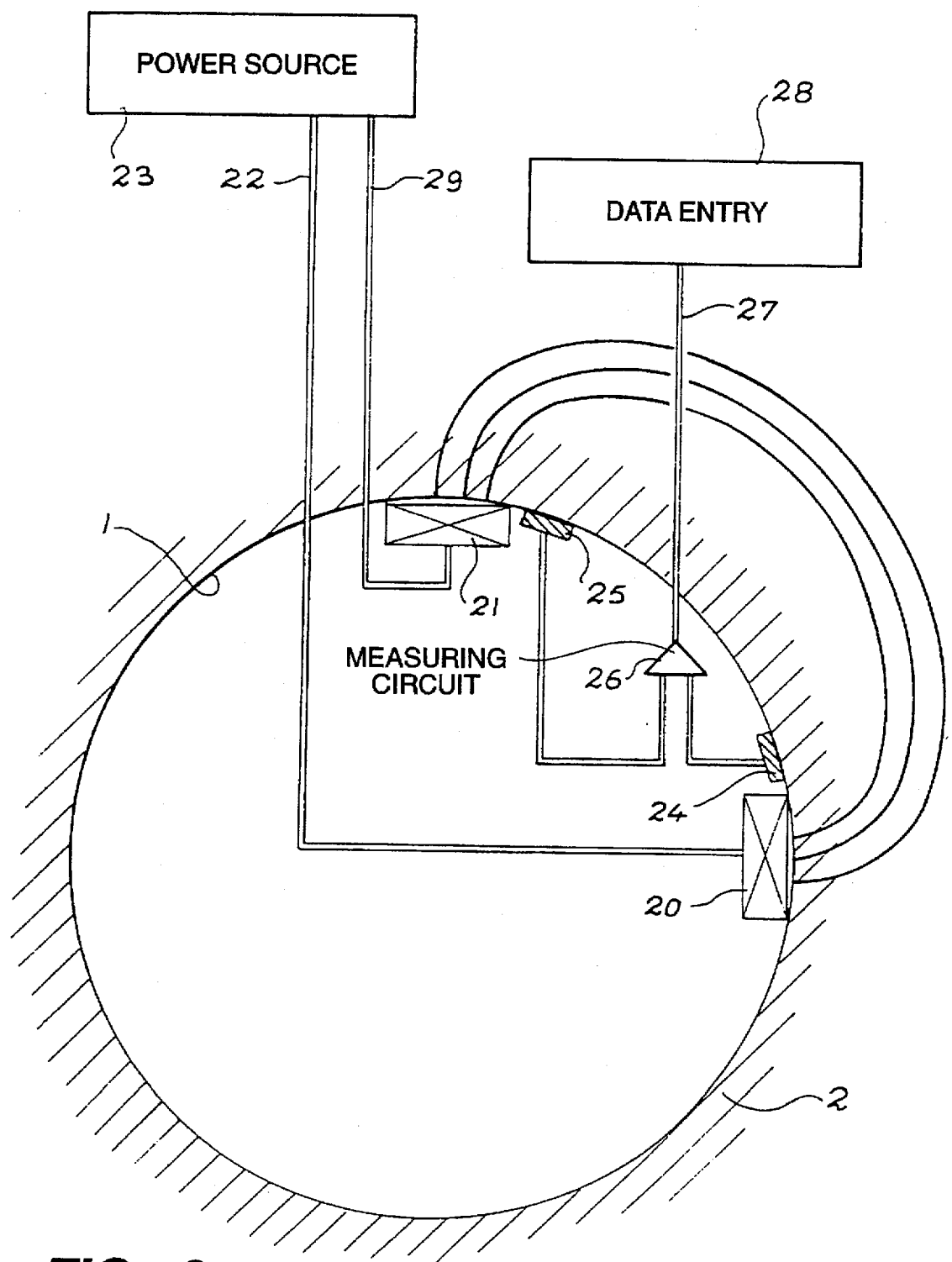
FIG._3

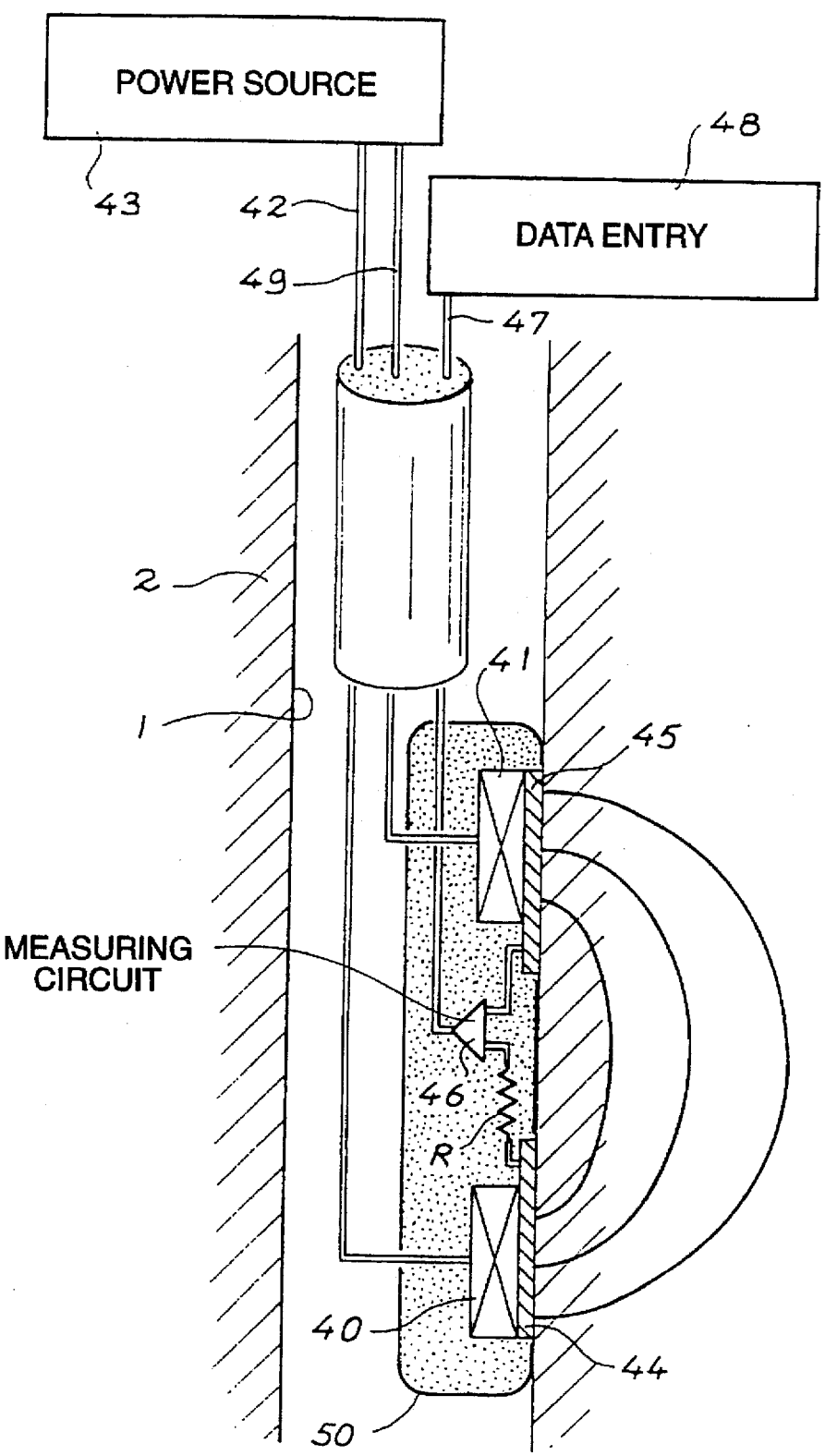
FIG._4

DETERMINATION OF THE POROSITY AND PERMEABILITY OF A GEOLOGICAL FORMATION FROM AN ELECTROFILTERING PHENOMENON

FIELD OF THE INVENTION

The present invention concerns a method for determining the porosity and permeability of a geological formation from an electrofiltering phenomenon. It also concerns devices to implement this method.

BACKGROUND OF THE INVENTION

One major problem for exploiting oil deposits is that of determining the quantity of hydrocarbides which can be extracted from a deposit. All the prospecting and exploitation means are used to resolve this problem whose solution is not direct.

The method is known on how to determine the permeability of a geological formation on the basis of an electrofiltering effect linked to the passage of a fluid in a permeable medium. This determination is effected from a bore hole drilled in the geological formation. The electrofiltering effects depends in particular on the permeability of the rock constituting the formation and the nature of the fluid(s) it contains. In an approached model, the potential U(t) due to the electrofiltering phenomenon is expressed by the following equation:

$$U_{(t)} = \Delta p_{(t)} \cdot \epsilon \cdot \zeta / (4\pi \cdot \mu \cdot \sigma)$$

provided:
— the flow of the flux is laminar
— the dimensions of the pores are greater than the thickness of the double electrochemical film,
— the surface conductance is less than that of the fluid,
with:
—$\Delta p(t)$ pressure difference according to the time t,
—$\epsilon, \mu, \sigma$ dielectric constant, viscosity and conductivity of the fluid respectively,
—$\zeta$ zeta potential characterising the solid/liquid interface.

Secondly, this equation is valid for fluids with slight conductivity, that is for $\sigma < 0.01$ S/m. In the case of higher conductivities, which occurs in the petroleum field, especially in the presence of drilling fluid in water, the potential decreases and the associated electrofiltering current increases.

On the basis of said equation, several methods for determining the permeability of a geological formation have been drawn up and are disclosed in the patents U.S. Pat. No. 3,599,085, U.S. Pat. No. 4,427,944 and EP-B-43 768.

These methods are based on a measurement of the electrofiltering potential which is directly proportional to the pressure produced by pressure, generators. Now this pressure is highly dependent on contacts between the pressure generators and the formation, contacts which are extremely disturbed by the irregularities existing at the level of the walls of the bore hole. This results in having inaccuracies concerning the measurement of the permeability of the geological formation.

SUMMARY OF THE INVENTION

The object of the present invention is to resolve this drawback by implementing another measuring concept based on the existence of non-linear electrofiltering phenomena. These phenomena have several origins based on the existence of a double phase of non-mixable fluids and on the local deformations of the formation (long or short distant movement of grains) owing to application of a local pressure.

These non-linear phenomena can be expressed by a critical phenomenon, such as a resonance phenomenon of the propagation of the pressure wave signalling a significant discontinuity. The value of the critical frequency is linked to the characteristics of the formation and in particular to the porosity and permeability. Secondly, the permeability depends on the diameter of the grains of the rock constituting the geological formation, the porosity and the parameters of the fluid, such as the temperature, viscosity and the specific weight. Knowing the value of the critical frequency makes it possible to deduce from this the value of porosity and then the value of permeability or vice versa.

Discontinuity is detected from following up the evolution of the electric variables linked to eletrofiltering, voltage or current.

One first object of the invention therefore consists of a method for determining the porosity and/or permeability of a geological formation likely to generate non-linear electrofiltering phenomena from an electrofiltering effect generated in the formation, said method including stages consisting of:

—mechanically and repeatedly exciting the fluid of said formation so as to propagate a pressure wave with suitable characteristics for generating an electrofiltering effect in the formation, —measuring a variable representative of the electrofiltering potential generated in the formation by said pressure wave, wherein it further includes stages consisting of:
—determining the critical frequency of propagation of the pressure wave by varying the mechanical excitation frequency of the formation and following up the corresponding variation of the variable representative of the non-linear electrofiltering phenomenon, —determining the porosity and/or permeability of the formation on the basis of the relation linking them to said critical frequency or from charts.

The pressure wave can be generated by a single excitation source or by two sources providing waves of the same frequency but shifted so as to channel the excited fluid. In this latter case, the phase shift is preferably 180° so that one of the sources plays the role of a compressor for a half-period whilst the other plays the role of a pump and conversely for the next half-period.

The invention also concerns a device to implement said method in a geological formation traversed by a bore hole, wherein it includes:

—a pressure generator constituting the excitation source and disposed against the wall of the bore hole for carrying out said fluid excitation under a variable frequency, —means to measure said frequency, —electrodes applied to said wall so as to collect said variable representative of the electrofiltering potential, —electronic means connected to said electrodes so as to measure said variable representative of the electrofiltering potential and follow up its corresponding variation.

The invention further concerns a device to implement said method in a geological formation traversed by a bore hole, wherein it includes:

—two pressure generators disposed against the wall of the bore hole so as to constitute the two sources providing waves of the same frequency but shifted, said frequency being variable, —means for measuring said frequency, —electrodes applied to said wall so as to collect said variable representative of the electrofiltering potential, —electronic means connected to said electrodes so as to measure said variable representative of the electrofiltering potential and follow up its corresponding variation.

When the device uses two pressure generators, the latter can be disposed so as to be located inside a variable plane between a perpendicular position and a position parallel to the axis of the bore hole.

The non-linear electrofiltering phenomena can also be exploited in another way in a configuration using two sources emitting a pressure wave. The measuring technique then consists of keeping constant the frequency of the said and of varying the phase difference between the sources whilst observing evolution of the detected signal which passes through an extremum for a given phase difference which is linked to the characteristics of the formation, especially porosity and permeability. Charts may also be used to determine the porosity and permeability values.

The invention therefore concerns a method for determining the porosity and/or permeability of a geological formation likely to generate non-linear electrofiltering phenomena from an electrofiltering effect generated in the formation, said method including stages consisting of:

—mechanically and repeatedly exciting the fluid of said formation so as to propagate a pressure wave with suitable characteristics for generating an electrofiltering effect in the formation, —measuring a variable representative of the electrofiltering potential generated in the formation by said pressure wave, wherein:

—as the pressure wave is produced by two sources supplying waves of a given frequency and making it possible to channel the excited fluid and as the waves provided by the two sources are shifted with the phase jump between the two sources being adjustable, the variable representative of the electrofiltering potential measured is determined for this phase jump value and passes through an extremum, —the porosity and/or permeability of the formation are determined on the basis of the relation linking them to said critical frequency or from charts.

The invention also concerns a device to implement said method in a geological formation traversed by a bore hole, wherein it includes:

—two pressure generators disposed against the wall of the bore hole so as to constitute said two sources, —means for measuring the phase jump between the waves provided by the two sources, —electrodes applied to said wall so as to collect said variable representative of the electrofiltering potential, —electronic means connected to said electrodes so as to measure said variable representative of the electrofiltering potential and follow up its corresponding variation.

Also in this case, the pressure generators may be disposed so as to be located inside a variable plane between a perpendicular position and a position parallel to the axis of the bore hole.

BRIEF DESCRIPTION OF THE DRAWINGS

The invention shall be more clearly understood and other advantages and characteristics shall appear more readily from a reading of the following description accompanied by the annexed drawings including FIGS. 1 to 4 which represent a large number of embodiments of the invention of devices for determining the porosity and/or permeability of a geological formation on the basis of an electrofiltering effect.

DETAILED DESCRIPTION OF THE PREFERRED EMBODIMENTS

The device of FIG. 1 is able to measure the porosity and/or permeability by searching for the resonance frequency of propagation of the pressure wave. It is shown in a position in the bore hole 1 drilled in the geological formation 2 and in particular includes a pressure generator 11. This pressure generator may be a hydraulic transducer, such as the one used in the patent U.S. Pat. No. 3,599,085 mentioned earlier. It may be an electromagnetically shielded electromagnetic vibration exciter which has the advantage of being fed at a frequency half that of the vibration (several hundreds of hertz), which makes it possible to filtrate the signals. Regardless of the type of generator used, it is connected by an electric cable 12 to a low frequency electric power source 13 situated on the surface. The frequency of this power source is less than several kHz.

Two electrodes 14 and 15, made of graphite, platinum or silver chloride for example, are applied to the wall of the bore hole. In practice, the distance between the electrodes may be 10 cm and the distance between the generator and the electrodes may be 10 cm.

The electrodes 14 and 15 are connected to an electronic measuring circuit 16 situated in the hole 1 close to the electrodes and thus in an environment with a high temperature (about 175° C.). The measuring circuit 16 is constituted by an extremely low level voltage amplifier followed by a synchronous detection. This circuit is connected by an electric cable 17 to an electronic data entry circuit 18. The arrowed lines represented in the geological formation show the directions of movement of the fluid(s) contained in the formation support 5 may protect the inner cables such as cable 17 and 19.

The electrodes 14 and 15 pick up an electric potential difference due to the electrofiltering phenomenon provoked by the generator 11 in the geological formation. The detected and amplified signal collected makes it possible to follow up in the form of a voltage the influence the frequency has on the value of this signal.

By varying the frequency of the power supply 13, it is sought to find which is the frequency for which the data entry circuit 18 provides a maximum detected voltage. This maximum voltage corresponds to the resonance frequency. The calculation by using, say, a computer, makes it possible to deduce from this the porosity and permeability values. It is also possible to make use of charts set up on the basis of previous experiments carried out in a laboratory.

The device of FIG. 2 implements two pressure generators 20 and 21 connected by electric cables 22 and 29 excited to the same frequency but at different phases and controlled from a low frequency electric power supply 23 furnishing two signals with controllable phase difference. A phase difference of 180° enables one of the generators to play the role of a compressor for one half-period, whereas the other plays the role of a pump, and conversely for the next half-period. This technique makes it possible to channel the flow of moving fluid(s), as showed by the signs drawn in the geological formation.

Each electrode 24, 25 is disposed close to a pressure generator. As earlier, the electrodes are connected to an electronic measuring circuit 26 situated in the hole 1. The circuit 26 is connected by an electric cable 27 to an electronic data entry circuit 28.

The search for the resonance frequency is effected as previously in the same way as for the calculation of porosity and permeability.

FIG. 2 shows a vertical disposition of the two generators requiring a vertical channelling of the fluid flow. By disposing the pressure generators 20 and 21 horizontally as shown on FIG. 3 where the bore hole 1 is seen as a cross section, it is possible to obtain porosity and permeability values in a horizontal direction.

Permeability and porosity measurements according to directions slanted with respect to vertical are also possible by accordingly disposing the pressure generators.

In the configuration using two pressure generators, it is also possible to carry out a current detection by closing the electric circuit by an ammeter and a suitable resistor, both placed between the electrodes. FIG. 4 shows an example of this embodiment.

FIG. 4 shows that the electrodes 44 and 45 are each situated between the corresponding pressure generator 40 or 41 and the wall of the bore hole 1. In this case, the electrodes, made for example of graphite, silver chloride or platinum, are porous so as to leave the passage free to the fluid. Electric cables 42 and 49 connect the electric power supply 43 to the pressure generators 40 and 41 respectively.

The electrodes 44 and 45 are connected by an electric circuit including a resistor R and an electronic measuring circuit 46. The amplitude of the current traversing the electric circuit connecting the electrodes 44 and 45 depends in particular on the value of the resistor placed in this circuit. According to the value of this resistor, the measuring circuit may be formed, as shown on FIG. 4, of a low level ammeter in series with the resistor R, this ammeter being followed by a synchronous detection. The measuring circuit may also be formed, according to the value of the resistor, of a low level voltage amplifier connected to the terminals of the resistor R, this parallel circuit being connected between the electrodes 44 and 45 and the voltage amplifier being followed by a synchronous detection, as for the potential measurement.

A dielectric casing 50 containing the electrodes, the generators and the electric circuit connecting the electrodes forces the current to pass through the measuring circuit. However, the casing 50 must not cover the face of the electrodes in contact with the wall of the bore hole 1 so as to enable the fluid to pass through these electrodes.

The configuration using two out-of-phase pressure generators may also be used as follows. The vibration frequency of the pressure generators is kept constant and the phase difference is made to vary between the generators whilst observing evolution of the detected signal. The phase jump is measured by a suitable device. A recording is made of the value of the phase jump corresponding to an extremum of the electric variable detected. As this phase jump value is linked to the characteristics of the formation, especially to porosity and permeability, it is possible to deduce from this by means of calculation or with the aid of charts the values of the porosity and permeability of the formation.

What is claimed is:

1. Method for determining the porosity and/or permeability of a geological formation likely to generate non-linear electrofiltering phenomena from an electrofiltering effect generated in the formation and including stages consisting of:

—mechanically and repeatedly exciting a fluid of said formation so as to propagate a pressure wave with suitable characteristics for generating an electrofiltering effect in the formation, —measuring a variable representative of an electrofiltering potential generated in the formation by said pressure wave, wherein it further includes stages consisting of:

—determining a critical frequency of propagation of the pressure wave by varying a mechanical excitation frequency of the formation and following up the corresponding variation of the variable representative of the non-linear electrofiltering phenomenon, —determining the porosity and/or permeability of the formation on the basis of the relation linking them to said critical frequency.

2. Method according to claim 1, wherein the pressure wave is produced by a single excitation source.

3. Method according to claim 1, wherein the pressure wave is produced by two sources providing waves of the same frequency but shifted so as to channel the excited fluid.

4. Method according to claim 3, wherein a phase jump between the two sources is 180°.

5. Device to implement the method according to claim 2 in a geological formation traversed by a bore hole, wherein it includes:

—a pressure generator constituting the excitation source and disposed against the wall of the bore hole for carrying out said fluid excitation under a variable frequency, —means to measure said frequency, —electrodes applied to said wall so as to collect said variable representative of the electrofiltering potential, —electronic means-connected to said electrodes so as to measure said variable representative of the electrofiltering potential and follow up its corresponding variation.

6. Device to implement the method according to claim 3 in a geological formation traversed by a bore hole, wherein it includes:

—two pressure generators disposed against the wall of the bore hole so as to constitute the two sources providing waves of the same frequency but shifted, said frequency being variable, —means for measuring said frequency, —electrodes applied to said wall so as to collect said variable representative of the electrofiltering potential, —electronic means connected to said electrodes so as to measure said variable representative of the electrofiltering potential and follow up is corresponding variation.

7. Device according to claim 6, wherein, as said variable representative of the electrofiltering potential is an electric current, the electrodes are each inserted between a pressure generator and the wall of the hole, the electrodes being porous so as to leave a free passage for the excited fluid.

8. Device according to claim 6, wherein the pressure generators are disposed so as to be located inside a variable plane between a perpendicular position and a position parallel to the axis of the bore hole.

9. Method for determining the porosity and/or permeability of a geological formation likely to generate non-linear electrofiltering phenomena from an electrofiltering effect generated in the formation and including stages consisting of:

—mechanically and repeatedly exciting a fluid of said formation so as to propagate a pressure wave with suitable characteristics for generating an electrofiltering effect in the formation, —measuring a variable representative of an electrofiltering potential generated in the formation by said pressure wave, wherein:

—as the pressure wave is produced by two sources supplying waves of a given frequency and making it possible to channel the excited fluid and as the waves provided by the two sources are shifted with a phase jump between the two sources being adjustable, the variable representative of the electrofiltering potential measured is determined for this phase jump value and passes through an extremum at a critical frequency, —the porosity and/or permeability of the formation are determined on the basis of the relation linking them to said phase jump value or from charts.

10. Device to implement the method according to claim 9 in a geological formation traversed by a bore hole, wherein it includes:

—two pressure generators disposed against the wall of the bore hole so as to constitute said two sources, —means to measure the phase jump between the waves supplied by the two sources, —electrodes applied to said wall so as to collect the variable representative of the electrofiltering potential, —electronic means connected to said electrodes so as to measure said variable representative of the electrofiltering potential and follow up its corresponding variation.

11. Device according to claim 10, wherein, as said variable representative of the electrofiltering potential is an electric current, the electrodes are each inserted between a pressure generator and the wall of the hole, the electrodes being porous so as to leave a free passage for the excited fluid.

12. Device according to claim 10, wherein the pressure generators are disposed so as to be located inside a plane that may be varied between a perpendicular position and a position parallel to the axis of the bore hole.

13. Device to implement the method according to claim 4 in a geological formation transversed by a bore hole, wherein it includes:

—two pressure generators disposed against the wall of the bore hole so as to constitute the two sources providing waves of the same frequency but shifted, said frequency being variable, —means for measuring said frequency, —electrodes applied to said wall so as to collect said variable representative of the electrofiltering potential, —electronic means connected to said electrodes so as to measure said variable representative of the electrofiltering potential and follow up is corresponding variation.

14. Device according to claim 7, wherein the pressure generators are disposed so as to be located inside a plane that may be varied between a perpendicular position and a position parallel to the axis of the bore hole.

15. Device according to claim 11, wherein the pressure generators are disposed so as to be located inside a plane that may be varied between a perpendicular position and a position parallel to the axis of the bore hole.

16. Method for determining the porosity and/or permeability of a geological formation likely to generate non-linear electrofiltering phenomena from an electrofiltering effect generated in the formation and including stages consisting of:

—mechanically and repeatedly exciting a fluid of said formation so as to propagate a pressure wave with suitable characteristics for generating an electrofiltering effect in the information, —measuring a variable representative of an electrofiltering potential generated in the formation by said pressure wave, wherein it further includes stages consisting of:

—determining the critical frequency of propagation of the pressure wave by varying a mechanical excitation frequency of the formation and following up the corresponding variation of the variable representative of the non-linear electrofiltering phenomenon, —determining the porosity and/or permeability of the formation from charts.

* * * * *